United States Patent
Sarnowsky et al.

(10) Patent No.: US 7,868,585 B2
(45) Date of Patent: Jan. 11, 2011

(54) WIRELESS CHARGING DEVICE

(75) Inventors: Melvin J. Sarnowsky, Livonia, MI (US); Robert B. Bucciarelli, Plymouth, MI (US); Royce D. Channey, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 753 days.

(21) Appl. No.: 11/863,802

(22) Filed: Sep. 28, 2007

(65) Prior Publication Data

US 2008/0079388 A1 Apr. 3, 2008

Related U.S. Application Data

(60) Provisional application No. 60/848,987, filed on Oct. 3, 2006.

(51) Int. Cl.
*H02J 7/00* (2006.01)
*B60L 1/00* (2006.01)
*B60L 9/00* (2006.01)

(52) U.S. Cl. .................. 320/108; 320/103; 320/104; 320/109; 191/10; 307/10.1

(58) Field of Classification Search ................. 320/108
See application file for complete search history.

(56) References Cited

U.S. PATENT DOCUMENTS

| D360,723 | S | 7/1995 | Kasai et al. |
|---|---|---|---|
| D363,917 | S | 11/1995 | Kanou et al. |
| 5,952,814 | A * | 9/1999 | Van Lerberghe ............ 320/108 |
| D421,443 | S | 3/2000 | Nagele et al. |
| D455,397 | S | 4/2002 | Weiner et al. |
| D456,351 | S | 4/2002 | Yoneda |
| D510,208 | S | 10/2005 | Klimas |
| D516,023 | S | 2/2006 | Quinn |
| D525,193 | S | 7/2006 | Vu |
| D530,274 | S | 10/2006 | Rabie et al. |
| D551,617 | S | 9/2007 | Houghton |
| D553,106 | S | 10/2007 | Griffin |
| 2005/0007067 | A1 * | 1/2005 | Baarman et al. ............ 320/108 |
| 2005/0162125 | A1 * | 7/2005 | Yu et al. ..................... 320/108 |
| 2006/0087282 | A1 | 4/2006 | Baarman et al. |
| 2007/0046254 | A1 | 3/2007 | Chen et al. |

OTHER PUBLICATIONS

Paradiso, Joseph A., Systems for Human-Powered Mobile Computing, Responsive Environments Group—MIT Media Laboratory E15-327, Jul. 24-28, 2006, pp. 645-650.

* cited by examiner

*Primary Examiner*—Edward Tso
*Assistant Examiner*—Yalkew Fantu
(74) *Attorney, Agent, or Firm*—Dicksinson Wright PLLC (57) ABSTRACT

A wireless charging device which locates a portable electronic device for efficient charging while providing a secure, stable and usable platform for the portable electronic device.

17 Claims, 7 Drawing Sheets

WIRELESS CHARGING DEVICE

CROSS REFERENCE TO RELATED APPLICATION

This application claims the benefit of U.S. Provisional Application No. 60/848,987, filed Oct. 3, 2006, the entire disclosure of the provisional application being considered part of the disclosure of this application and hereby incorporated by reference.

BACKGROUND OF THE INVENTION

1. Technical Field

This present invention relates to a device for wirelessly charging electronic devices and, more specifically, to a device for providing a secure and stable platform for wirelessly charging electronic devices in vehicles.

2. Discussion

Electronic devices are used throughout our daily lives for many things including communication, entertainment, and time management. Electronic devices are increasingly becoming more portable and more powerful allowing more users to do an increasing amount of activities remotely in the course of daily life. For example, many people now have smart phones which allow them to access e-mail, surf the web, and do other activities in addition to phone services. Other electronic devices commonly used include cameras, traditional cell phones, music players, and video players. Such devices are powered by batteries and require the user to continually monitor battery life and recharge batteries when needed.

Charging portable electronic devices generally includes the use of a charging cord having a connector connected to a source of electricity. Typically, the charging cord is plugged into a wall socket within a house, office, or other building. As these electronic devices are generally designed for mobile communication, entertainment, and time management, many times users are away from the home, office, or other locations where they may easily charge the device. To charge electronic devices remotely, many users have also purchased charging cords which allow mobile charging of the electronic device through a vehicle's electrical system. More specifically, these cords are generally plugged into a power outlet such as the power outlet commonly referred to in a vehicle as a cigarette lighter outlet. The charging cord connects on one end to the power outlet and on the other end to an electronic device through a connector. Charging cords provided by the manufacturers of electronic devices typically include unique connector arrangements for each device type. For example, an electronic device such as a cell phone is not likely to have the same connector arrangement as a portable compact disc player or a digital camera, and even different device manufactures use different connector arrangements for their electronic devices, such as different cell phones manufactures traditionally have different proprietary connector arrangements for their cell phones. Not only is it inconvenient to purchase a charging cord for a vehicle, but if two users of a vehicle have differing cell phones as well as differing devices, multiple charge cords may need to be purchased and stored in the vehicle. Finding the correct charging cord, if multiple cords are in the vehicle is very distracting to the driver of a vehicle and vehicles have limited storage space, most of which is not easily accessible to the driver of a vehicle. More distracting or frustrating to the end user is when multiple charge cords become tangled, especially when quick charging of a portable device before the battery fails is required. Given the frequency that the charge cords are plugged in and unplugged, they quickly become inoperable requiring the purchase of an additional charge cord.

Also, while the vehicle is in motion, typically a lack of locations exists to securely store the electronic device while being charged while still allowing access to the device by vehicle occupants. For example, many users attach a cell phone to a charger cord plugged into a power outlet on the vehicle and then to prevent the cell phone from falling onto the floor or under a seat, place the cell phone loosely in a free cup holder. Such placement within a cup holder is not desirable as the cell phone is not visible or useable by the occupant unless it is removed, which may distract the operator of the vehicle. Also, the electronic device from the crude insertion, typically upside down into a cup holder, may become scratched over time. In addition, if the cup holders are already being used for retaining cups, the devices, such as cell phones are free to slide on the floor or under the seat, even when placed on a fairly flat center console.

One resolution to the cumbersome use of charge cords has been the introduction of electromagnetic induction technology or wireless charging. Induction technology is employed in a wide range of applications, both commercially and within the house. For example, applications which inductively include power transfer are the recharging of electric vehicles, the charging of electric toothbrushes, and powering smart tags and security tags. Such induction technology, however, has not been broadly transferred to portable electronic devices. For electromagnetic induction technology to be used to charge portable devices in vehicles, some have suggested providing a primary coil under each cup holder in the vehicle such that when the user places a cell phone in the cup holder loosely, the cell phone is charged, however this may add significant cost to each vehicle. Other examples of primary units that have been discussed are primary coils integrated into the sun visors and holders between the center console and passenger seats. Furthermore, when the primary coil of a primary charging unit is not aligned properly with the receiving coil or secondary coil in the portable device, the portable device is not efficiently charged. Therefore, placing a cell phone loosely in a cup holder may cause the cell phone to receive only limited charge through inductive charging to the frustration of the user.

SUMMARY OF THE INVENTION

In view of the above, the present invention is directed to a device for providing power to a portable device, wherein the device includes a base housing having a circumferential outer extent configured to fit within a cup holder in a vehicle and a longitudinal axis and wherein the base housing includes a base, and a top housing having a top surface and a front lip and wherein the top surface is angled relative to the longitudinal axis between being parallel to the longitudinal axis and perpendicular to the longitudinal axis and wherein the top surface is closer to the base proximate to the front lip than the top surface is to the base remote from the front lip. The device further includes a primary charging unit including a charging circuit and a primary coil for inductively providing power.

The top surface further includes a locating mechanism having a recessed surface and two locating edges. The top housing includes an outer lip and the top surface includes a locating mechanism having a recessed surface and wherein the recessed surface extends from the front lip to the opposing portion of the outer lip. The outer lip defines at least a portion of the front lip and has a rest surface approximately perpendicular to the top surface. The primary coil includes a flat surface and is located in close proximity to the top surface and wherein the flat surface is configured to be approximately parallel to the top surface.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
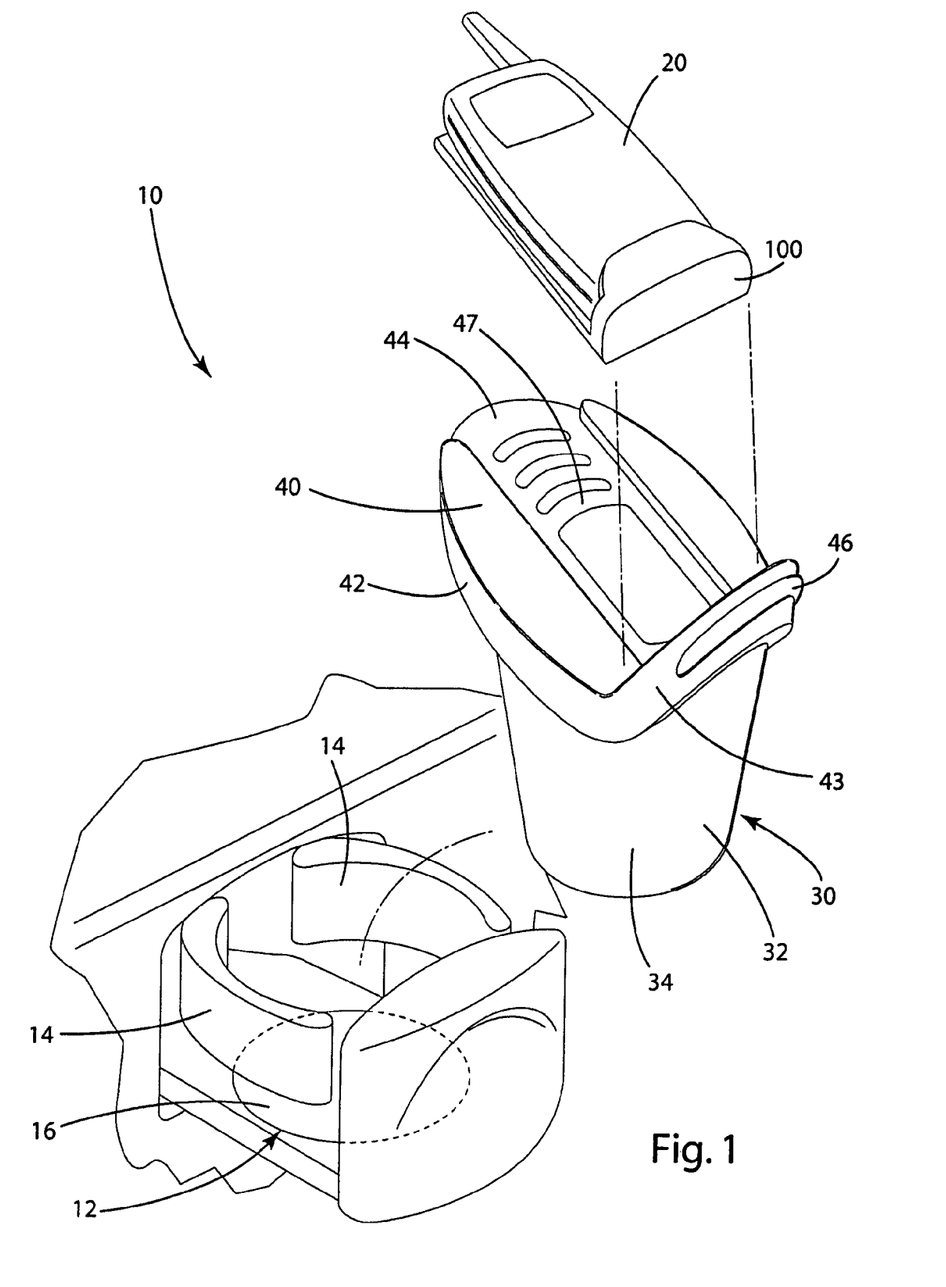
FIG. 1 is a perspective view of the wireless charging system and an exemplary cup holder.

FIG. 1 shows the wireless charging system 10 of the present invention including a portable electronic device 20, generally illustrated as a cell phone. It should be appreciated that the present invention is designed for use with many other electronic devices including, for example, personal data assistants, portable disc players, music players, and digital cameras. The portable electronic device 20 includes a battery (not shown) requiring periodic recharging in order to remain functional. As is known in the inductive charging technology, the portable electronic device 20 must be adapted for inductive charging including, without limitation, having a secondary coil as more fully described below.

Figure 7:
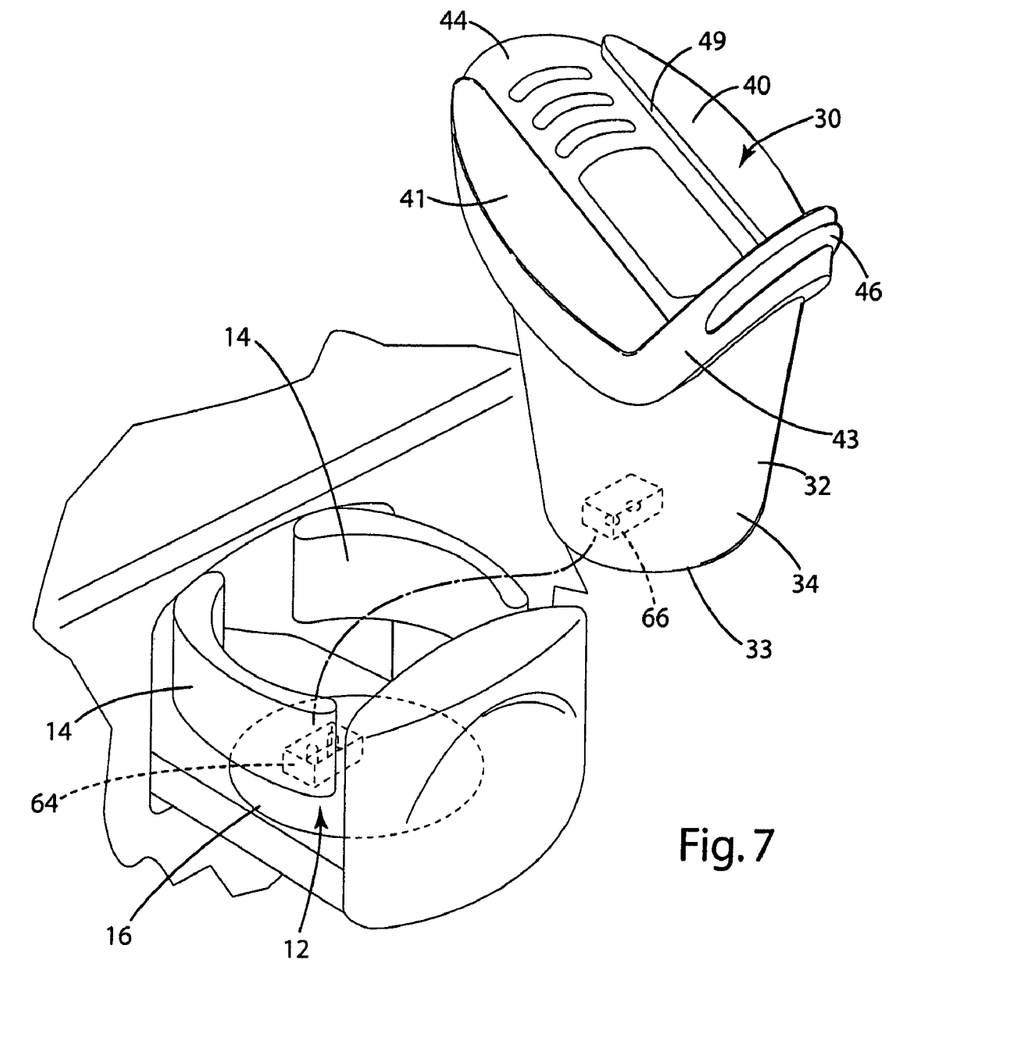
FIG. 7 is a perspective view of the wireless charging system including a plug for interfacing with the cup holder.
Figure 8:
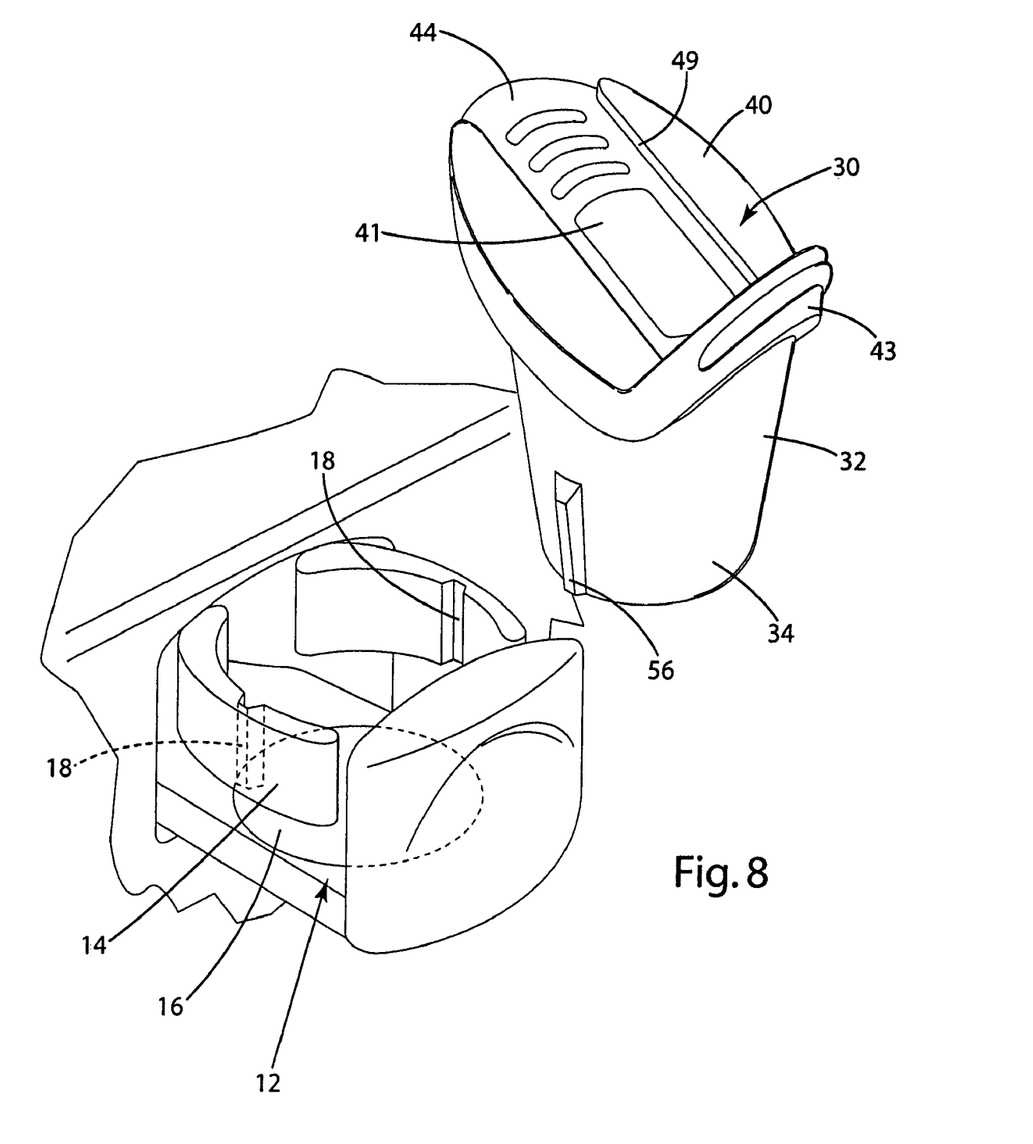
FIG. 8 is a perspective view of the wireless charging system having a keyed mechanism for interfacing in proper orientation with the cup holder.

The wireless charging system 10 is generally configured to fit within a cup holder 12 as illustrated in FIGS. 1 and 7-8. The cup holder 12 generally includes a retention mechanism 14 such as side walls which retain a cup in position and a base 16 on which a cup would rest.

The wireless charging system 10 also includes a holder 30 which is configured to receive the portable electronic device 20 and in turn is configured to be received and held securely in position by the cup holder 12. The holder 30 generally includes a base housing 32 and top housing 40. The base housing 32 is configured to fit within the cup holder 12 while the top housing 40 is configured to receive and securely retain for optimal charging the portable electronic device 20.

Figure 2:
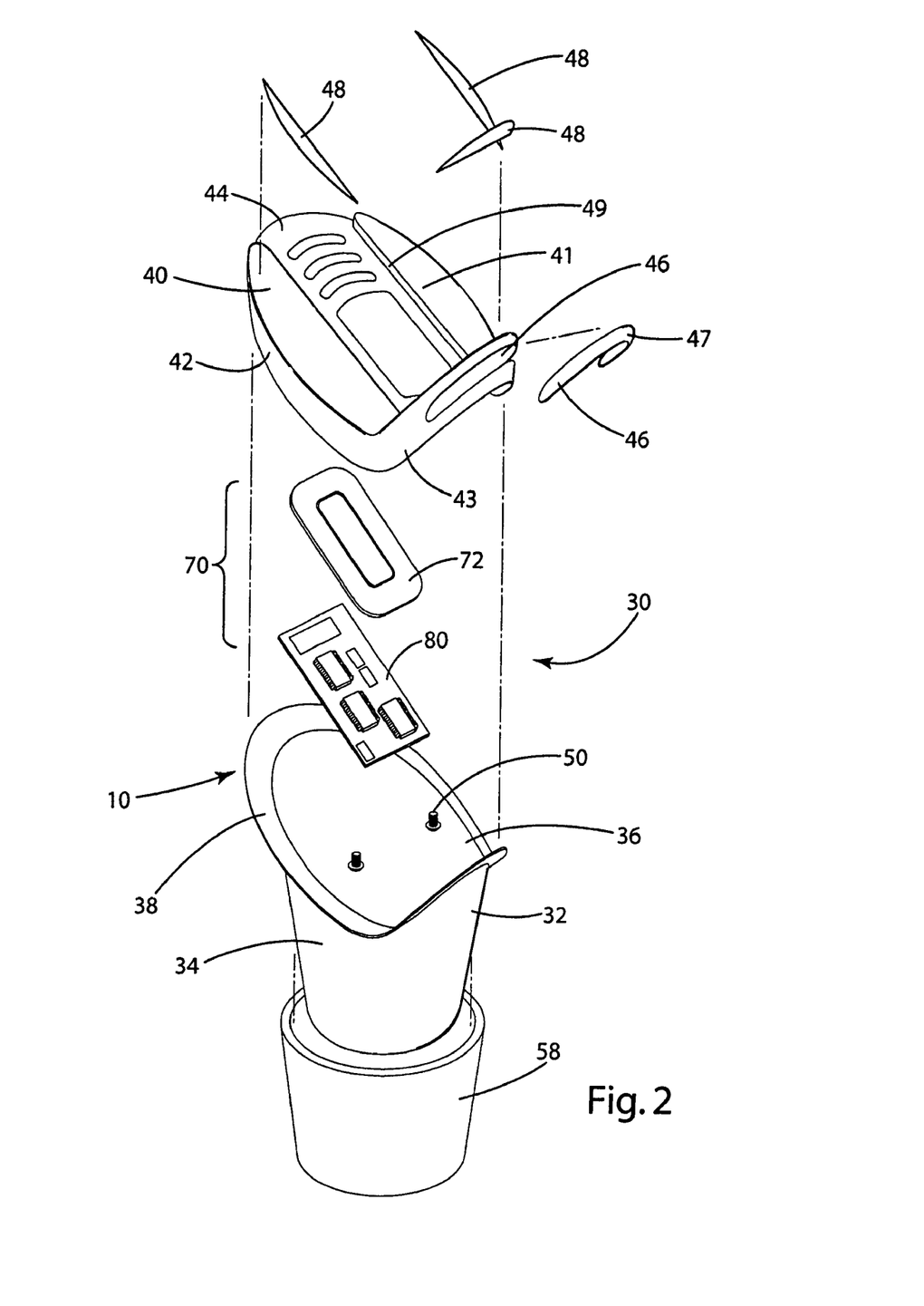
FIG. 2 is an exploded perspective view of the wireless charging system.

The base housing 32 is generally illustrated in FIGS. 1-8 as having a circumferential outer surface 34 arranged about a longitudinal axis 31. The circumferential outer surface 34 is generally configured to be shaped somewhat like a cup. The shaping of the outer surface 34 like a cup allows the base housing 32 to be inserted in almost all existing cup holders on the market and, as such, be securely retained within the cup holder 12. In some embodiments where a more secure fit is desired, the base housing 32 may be inserted into a fit insert 58 as illustrated in FIG. 2 to increase the diameter or change the configuration (not illustrated) of the base housing 32 to provide a more secure fit customized for a particular cup holder 12. For example, the fit insert 58 may take on a variety of sizes and shapes and may be produced and sold specific to a certain cup holder occurring on a certain manufacturer's vehicle or vehicles. By forming the base housing 32 with a circumferential outer surface 34 designed to fit approximately all cup holders on the market allows the holder 30 to be purchased aftermarket for securely retaining and holding a cell phone or electronic device for use in a vehicle while also allowing for inductive charging without providing or buying a specifically designed holders for a particular vehicle or requiring inductive chargers to be provided at each cup holder and in multiple locations within a vehicle.

The base housing 32 further includes a slanted portion 36, a base 33, and a outward lip 38 surrounding the slanted portion. A fastener mechanism, such as the illustrated pair of screws 50, allow for the attaching of the top housing to the base housing as well as securely locating any additional components such as the primary charging unit 70. While the base housing 32 is illustrated as having the slanted portion 36, of course, the holder 30 may be designed such that a variety of angles may be used while the top housing 40 compensates to provide for the desired angle of rest for the cell phone or other electronic device.

The top housing 40 generally includes an outer lip 42 for engaging the outward lip 38 of the base housing 32 and a top surface 41. The outer lip 42 further may form a portion of a front lip 43 which includes a rest surface 45 approximately perpendicular or angled relative to the top surface. The top surface 41 and rest surface 45 are configured to allow an electronic device to be placed on the top surface 41 and angled for the convenience of the user to allow the user to easily see the screen and work the buttons of the electronic device 20 while the holder is in a variety of positions relative to the user. The top surface is angled to an angle of approximately 45° for the convenience of the end user. As the top surface 41 is angled, the front lip 43 works in conjunction with the top surface 41 to prevent the electronic device 20 from sliding off the top surface and provides a location stop for the electronic device. As further illustrated in the figures, the top surface 41 may further include a locating mechanism 44 such as the illustrated slot in the figures. The locating 44 mechanism generally includes a recessed surface 47 and locating edges 49. An adaptor 100 which may be used to interface between electronic device 20 and the holder 30, and in particular if the device 20 does not include its own inductive secondary coil, may also be configured to be keyed or locked into the locating mechanism 44. The locating edges 49 may act as stops to prevent the electronic device 20 from being displaced off the top surface 41 of the top housing 40. Therefore, the recessed surface 47, locating edges 49, and front lip 43 including the rest surface 45 all act in conjunction to retain and hold the electronic device 20 at a position convenient for viewing and controlling the electronic device 20 by an occupant of a vehicle no matter if the holder 30 including the device 20 is placed in a center console area or along the dash of the vehicle. As further illustrated in FIG. 2, the top housing 40 may further include anti-friction pads 48 to prevent sliding of the electronic device 20 such as when electronic devices do not fit securely within the locating mechanism 44. The anti-friction pads 48 may be formed in various colors, shapes or configurations to fit a users individual preferences. A charge indicator 46, such as the illustrated light pipe 47, may be further included and have color coordination or other mechanism to provide the charging status to the user such as a green light for fully charged, a red light for charging, and a yellow light for a trickle charge of an almost fully charged battery.

Figure 3:
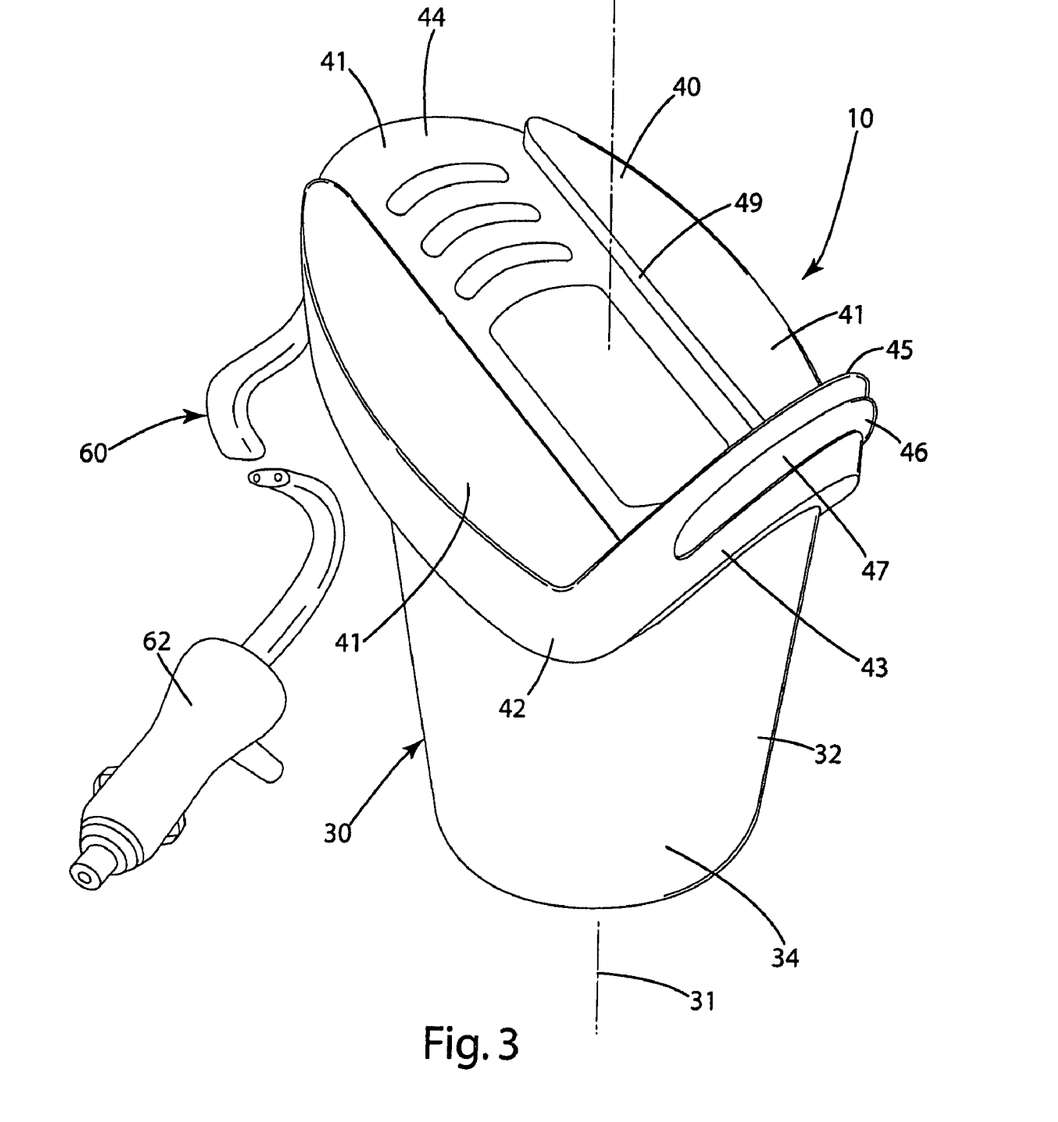
FIG. 3 is a perspective view of the wireless charging system including a power cord.
Figure 4:
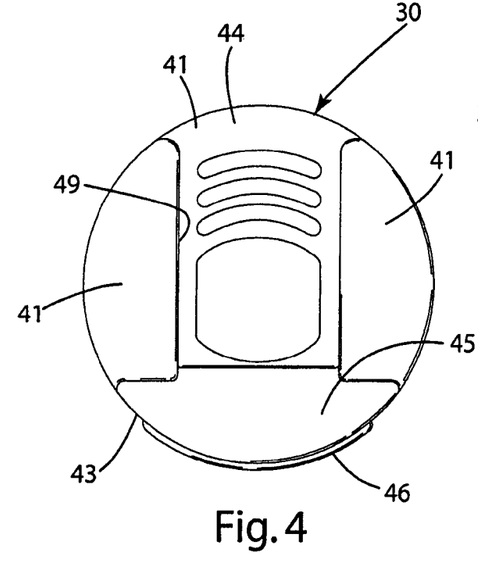
FIG. 4 is a top plan view of the holder.
Figure 5:
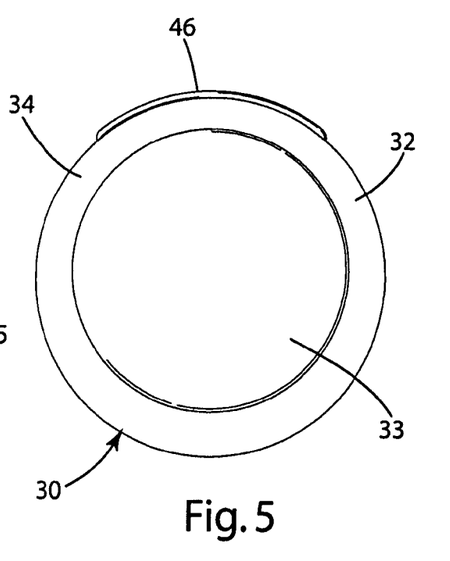
FIG. 5 is a bottom plan view of the holder.
Figure 6:
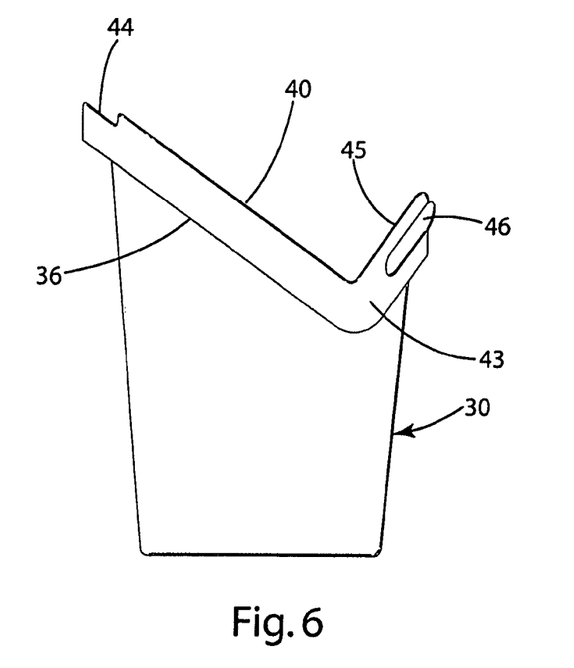
FIG. 6 is a left elevational view of the holder.

As illustrated in FIG. 3, if the holder 30 is purchased as an aftermarket accessory, may include a power cord 60 such as the illustrated power cord entering into a cigarette lighter adaptor 62. Of course, other power cords and configurations of power supplies may be used including the male plug 64 interfacing with the female plug 66 in FIG. 7. In some embodiments, the holder 30 may also be configured to receive an inductive charge from the cup holder 12 and in turn provide an inductive charge from the holder 30 to the portable electronic device 20. In some embodiments, the power cord may be interchangeable, such as one power cord for a vehicle, and another power cord to use inside a building.

As illustrated in FIG. 2, the holder 30 further includes within either the base housing 32, the top housing 40, or between the base housing 32 and top housing 40 a primary charging unit 70. The primary charging unit 70 generally includes a primary coil 72 having a flat surface 74 and a primary charging circuit 80. The flat surface 74 does not need to be necessarily flat but refers to the arrangement of the coil such that when a flat surface of a coil is placed in proximity and alignment with an opposing flat surface of a receiving coil, a charge passes at the most efficient possible transfer. However, it is expected in the present invention that the primary coil 72 is configured to have a somewhat flat shape providing the flat surface 74 as illustrated in the figures. The primary charging circuit 80 is well known in the art and generally includes an input power 110 such as by the illustrated power cord 60 into the charging circuit 80. The primary charging circuit 80 can be any known configuration or circuitry for providing inductive power transfer.

Figure 9:
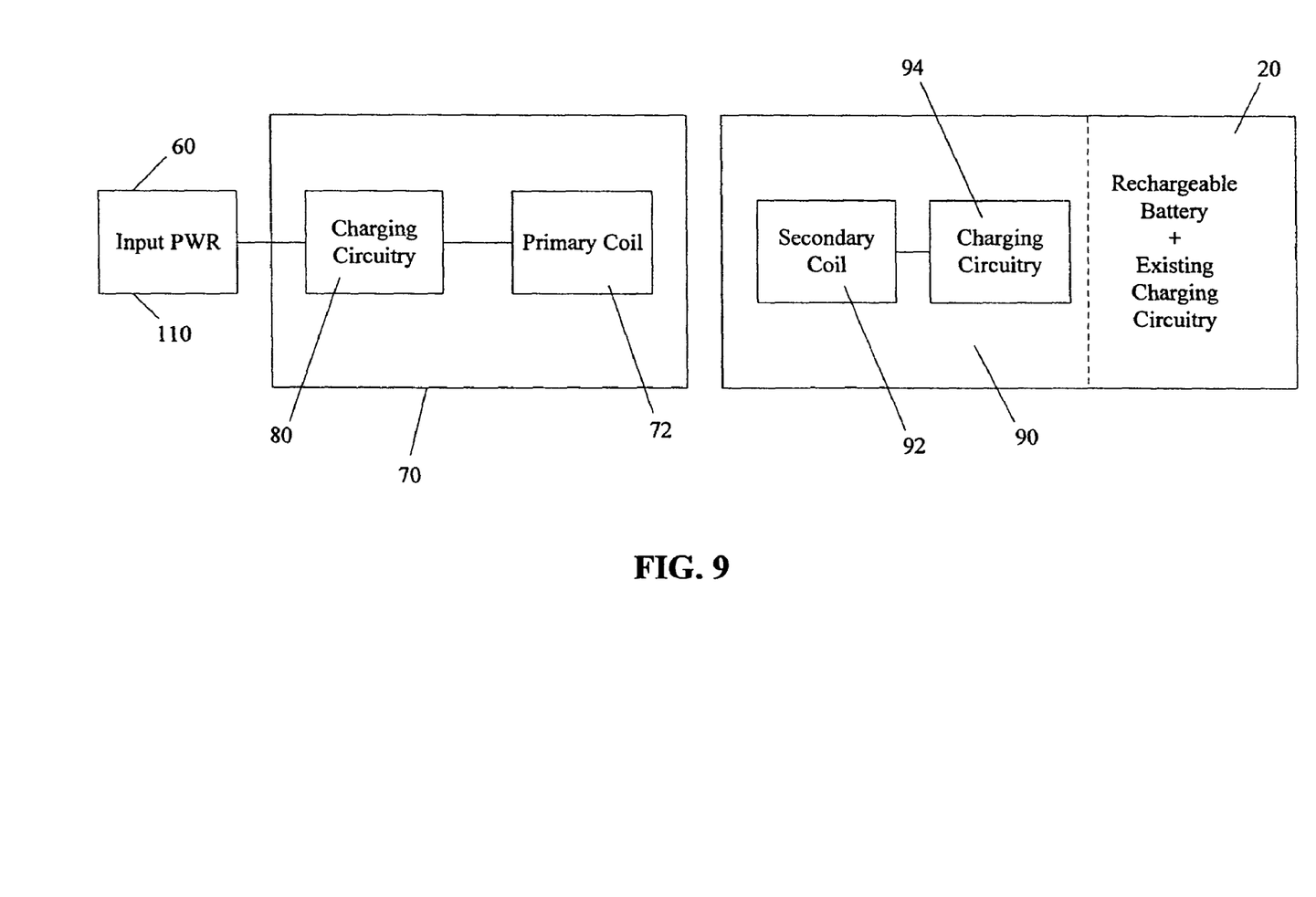
FIG. 9 is a schematic view of the wireless charging system.

The adaptor or portable electronic device 20 may include a secondary charging unit 90. If the portable electronic device 20 is unable to receive inductive power transfer, the adaptor 100 would be used to allow the inductive power transfer. The secondary charging unit 90 is illustrated in FIG. 9 and includes a secondary coil 92 and a secondary charging circuit 94. The primary charging unit 70 is generally configured to communicate reciprocally with the secondary charging unit 90. More specifically, the secondary charging unit 90 is configured to allow communication to the primary charging unit 70 regarding the current status of the battery as well as the charging status. By having communication between the secondary charging unit 90 and the primary charging unit 70, the charging units 70, 90 can adjust for optimal power transfer. While the primary charging unit 70 and secondary charging unit 90 are illustrated in FIG. 9 as communicating through the primary coil 72 and the secondary coil 92, additional coils or other communication means such as antennas may be used for communication. Predominantly, any inductively charged system known in the art may be used with the present invention holder 30.

The holder 30 is generally configured to fit within the cup holder 12 of a vehicle. The cup holder 12 may be any cup holder of the vehicle including center control cup holders as well as dash-based cup holders. In regards to dash-based cup holders 12, as illustrated in the figures, the holder 30 is designed and configured such that the holder, in particular the outer lip 42 of the top housing, does not interfere with or contact the dash.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A device for providing power to a portable device comprising:
    a base housing having a circumferential outer extent configured to fit within a cup holder in a vehicle and a longitudinal axis and wherein said base housing includes a base;
    a top housing having a top surface and a front lip and wherein said top surface is angled relative to said longitudinal axis between being parallel to said longitudinal axis and perpendicular to said longitudinal axis and wherein said top surface is closer to said base proximate to said front lip than said top surface is to said base remote from said front lip; and
    a primary charging unit including a charging circuit and a primary coil for inductively providing power.

2. The device of claim 1 wherein said top surface further includes a locating mechanism.

3. The device of claim 2 wherein said locating mechanism includes a recessed surface and two locating edges.

4. The device of claim 1 wherein said top housing includes an outer lip and said top surface includes a locating mechanism having a recessed surface and wherein said recessed surface extends from said front lip to the opposing portion of said outer lip.

5. The device of claim 4 wherein said outer lip defines at least a portion of said front lip.

6. The device of claim 1 wherein said front lip includes a rest surface approximately perpendicular to said top surface.

7. The device of claim 1 wherein said primary charging unit includes a power cord extending therefrom.

8. The device of claim 7 wherein said power cord includes a plug.

9. The device of claim 8 wherein said plug is a cigarette lighter plug.

10. The device of claim 8 wherein said plug is located in the base of said base housing and wherein said cup holder includes an electrical connection configured to interface with said plug and provide power to said primary charging unit.

11. The device of claim 8 wherein said base housing includes a inductive power receiving device configured to receive inductive power from said cup holder.

12. The device of claim 1 wherein said primary coil includes a flat surface and is located in close proximity to said top surface and wherein the said flat surface is configured to be approximately parallel to said top surface.

13. The device of claim 1 further include a fit insert, said fit insert designed to provide a secure fit between said cup holder and said base housing.

14. The device of claim 1 wherein said top surface includes friction pads.

15. The device of claim 1 further including an adaptor to interface between the device and the portable device.

16. The device of claim 15 wherein said adaptor is configured to fit within a recessed area on the top surface.

17. The device of claim 1 wherein said portable device is any electronic device having a rechargeable battery.

* * * * *